United States Patent
Mitev et al.

(10) Patent No.: US 6,816,394 B2
(45) Date of Patent: Nov. 9, 2004

(54) APPROXIMATED SINUSOIDAL WAVEFORM INVERTER

(75) Inventors: Kantcho Mitev, Toronto (CA); Primo Favaro, Mississauga (CA)

(73) Assignee: Natus Technology Corp., Woodbridge (CA)

( * ) Notice: Subject to any disclaimer, the term of this patent is extended or adjusted under 35 U.S.C. 154(b) by 18 days.

(21) Appl. No.: 10/378,629

(22) Filed: Mar. 5, 2003

(65) Prior Publication Data

US 2004/0174724 A1 Sep. 9, 2004

(51) Int. Cl.⁷ .............................................. H02M 1/12

(52) U.S. Cl. ............................ 363/40; 363/47; 363/131

(58) Field of Search .............................. 363/16, 40, 41, 363/43, 47, 97, 98, 131, 132, 133; 323/283

(56) References Cited

U.S. PATENT DOCUMENTS

| 4,117,364 A | * | 9/1978 | Baker | 363/43 |
| 5,510,974 A | * | 4/1996 | Gu et al. | 363/134 |
| 5,614,813 A | * | 3/1997 | Batson | 323/283 |
| 5,757,633 A | * | 5/1998 | Bowles | 363/71 |
| 6,452,819 B1 | * | 9/2002 | Wobben | 363/40 |

* cited by examiner

Primary Examiner—Jessica Han
(74) Attorney, Agent, or Firm—Gowling Lafleur Henderson LLP (57) ABSTRACT

A DC-to-AC inverter includes a switch stage having a switch output, a switch controller coupled to the switch stage, and a filter coupled to the switch output. The switch stage includes switch means coupled to the switch output for switching the switch output between a pair of power supply rails. The switch controller is configured to cyclically linearly vary the duty cycle of the output signal at the switch output. The filter is configured to produce a piece-wise linear approximated sinusoidal output waveform from the output signal.

24 Claims, 5 Drawing Sheets

APPROXIMATED SINUSOIDAL WAVEFORM INVERTER

FIELD OF THE INVENTION

The present invention relates to a DC-to-AC power inverter. In particular, the present invention relates to an inverter circuit having an output waveform which approximates a sinusoid.

BACKGROUND OF THE INVENTION

Power inverters are often used to control variable-speed AC motors, or to power AC loads from a DC power source. The conventional single-phase inverter circuit consists of a four electronic switches connected in an H-bridge configuration, and fed by a common DC voltage source. Each electronic switch typically consists of a thyristor or IGBT and a free-wheeling diode connected across the thyristor (IGBT). When the conduction interval of the respective switches is properly synchronized, the switches generate a square wave voltage signal between their respective outputs. The square wave output is then passes through a low-pass or integrating filter to thereby produce a sinusoidal output voltage signal.

Pulse-width modulation techniques are typically used to control the magnitude of the output voltage signal applied to the load. PWM-based inverters are advantageous, since the electronic switches can be commutated using a relatively simple control unit. However, PWM-based inverters typically generate high amplitude harmonics, thereby increasing the size of the low-pass filter required. Although harmonic distortion can be reduced by increasing the modulation frequency, this solution compromises efficiency since switching losses are proportional to the number of switch commutations per cycle. Also, since switching losses are proportional to the amplitude of the output voltage, it has been difficult to efficiently generate large output voltages using a PWM-based inverter. Accordingly, attempts have been made to develop an improved mechanism for converting DC power into AC power.

For instance, Baker (U.S. Pat. No. 4,117,364) teaches a waveform synthesizer inverter comprising a series of cascaded programmable bilateral switch stages. When the switch stages are properly controlled, the inverter produces an output voltage having a stepped quasi-sinusoid waveform. The amplitude and frequency of the output waveform are varied by altering the timing and conduction duration of the switch stages. Although this configuration also provides control over the harmonic content of the output waveform, the configuration also requires several switch stages to limit harmonic distortion to acceptable levels.

Bowles (U.S. Pat. No. 5,757,633) teaches a multi-step inverter which employs multiple series-connected inverter bridges to piecewise approximate a sinusoidal output waveform. Each inverter bridge is bypassed or switched into service as required to create a portion of a stair-stepped sinusoidal waveform. Each inverter bridge is pulse-width modulated to smooth each step and thereby produce a smoother sinusoid. Although this configuration reduces switching losses, the configuration also requires several inverter bridges to limit harmonic distortion to acceptable levels.

Wobben (U.S. Pat. No. 6,452,819) teaches an inverter which uses asymmetrical harmonics generated at the output of the inverter stage to reduce harmonic distortion. At the inverter output, the inverter includes a three-phase output choke having a fourth choke leg. The asymmetrical magnetic fluxes produced in the fourth leg by the asymmetrical harmonics are collected by way of three resonant circuits, and then fed back to the negative bar of the DC voltage intermediate circuit which powers the inverter stage. The patentee discloses that the magnetic fluxes in the fourth choke leg flow back into the three main legs of the output choke, thereby increasing the output inductance of the choke. However, the specialized output choke increases the cost of the inverter.

Therefore, there remains a need for a mechanism for efficiently converting DC power into AC power without increasing harmonic distortion.

SUMMARY OF THE INVENTION

According to the present invention, there is provided an inverter which is configured to produce an output signal having a piece-wise linear sinusoidal, trapezoidal or clipped triangular waveform.

The inverter, according to one aspect of the present invention, includes a switch stage having a switch output, a switch controller coupled to the switch stage, and a filter coupled to the switch output. The switch stage includes switch means coupled to the switch output for switching the switch output between a pair of power supply rails. The switch controller is configured to cyclically linearly vary the duty cycle of the output signal at the switch output. The filter is configured to produce a piece-wise linear approximated sinusoidal output waveform from the output signal.

The inverter, according to another aspect of the present invention, includes a switch stage having a switch output, a switch controller coupled to the switch stage, and a filter coupled to the switch output. The switch stage includes switch means coupled to the switch output and configured to provide a switched constant-peak-amplitude output signal at the switch output. The switch controller is configured to cyclically linearly vary the duty cycle of the output signal. The filter is configured to produce a piece-wise linear approximated sinusoidal output waveform from the output signal.

According to the present invention, there is also provided a method for converting DC power into AC power by producing from a DC signal an AC signal having a piece-wise linear sinusoidal, trapezoidal or clipped triangular waveform.

The method involves the steps of (1) with switch means generating with a pulse-width modulated output signal, the output signal having a cyclically linearly varying duty cycle and an amplitude varying between a pair of signal levels; and (2) filtering the output signal in a manner to produce a piece-wise linear approximated sinusoidal output waveform.

In accordance with one embodiment of the inverter, the switch means includes a first electronic switch coupled to one of the power supply rails, and a second electronic switch coupled to the other of the power supply rails, and the switch output is coupled to the interconnection of the electronic switches. The switch controller is configured to vary the duty cycle in a manner such that the output waveform has a first plateau corresponding to a first power supply signal level, a second plateau corresponding to a second power supply signal level, and an intermediate portion varying linearly between the first plateau and the second plateau. During the first plateau, the duty cycle is 0% (the first electronic switch is fully on and the second electronic switch is fully off); whereas during the second plateau, the duty cycle is 100% (the first electronic switch is fully off and the second electronic switch is fully on).

BRIEF DESCRIPTION OF THE DRAWINGS

The present invention will now be described, by way of example only, with reference to the accompanying drawings, in which.

DETAILED DESCRIPTION OF THE PREFERRED EMBODIMENTS

Power Inverter 100

Figure 1:
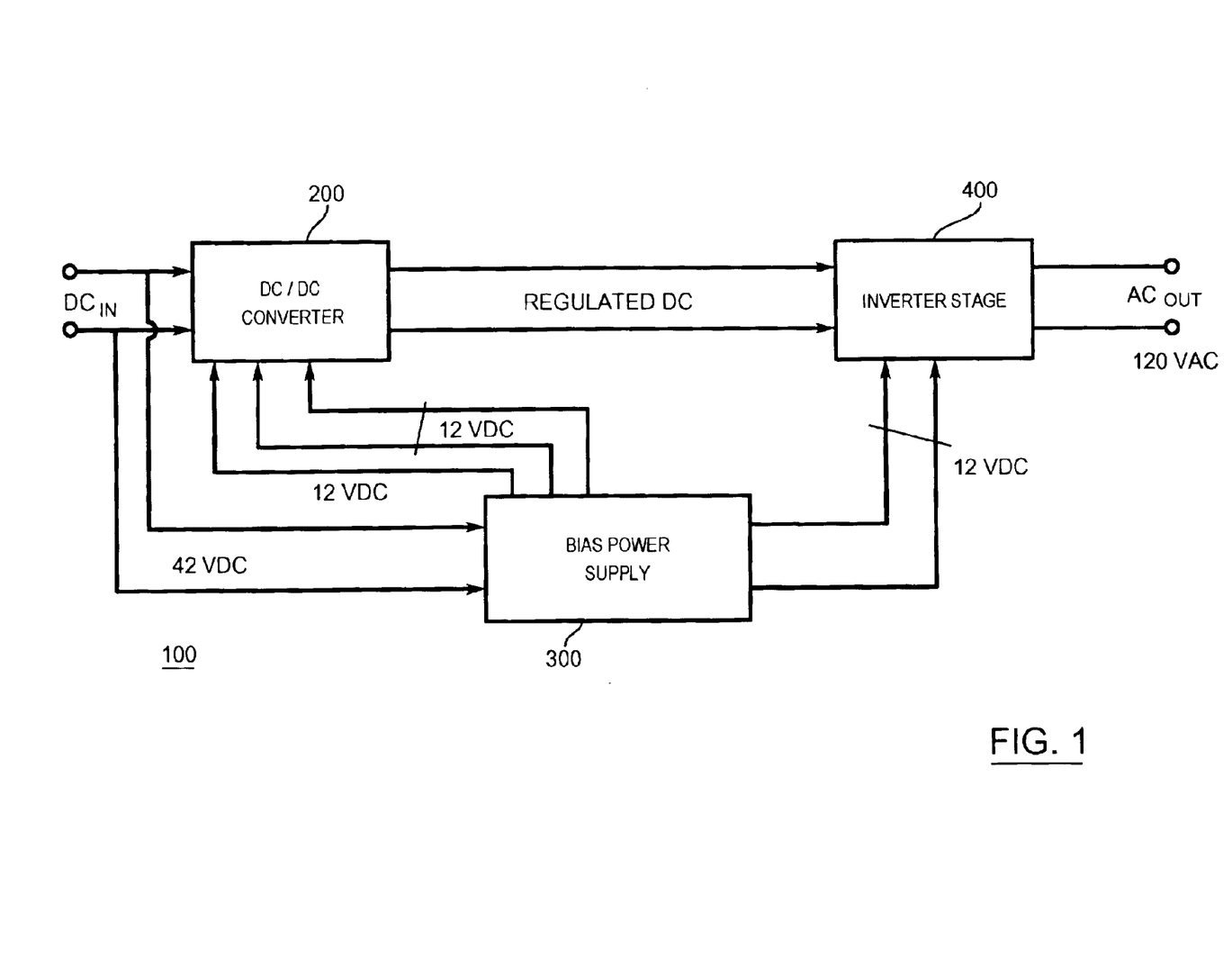
FIG. 1 is a schematic view of a DC-to-AC power inverter, depicting a DC/DC converter, a bias power supply, and the inverter stage according to the present invention.

FIG. 1 depicts a DC-to-AC power inverter according to the present invention. The power inverter, denoted generally as 100, is shown including a DC/DC converter 200, a bias power supply 300, and an inverter stage 400. The DC/DC converter 200 and the bias power supply 300 are each powered by the DC voltage input rail of the power inverter 100.

The DC/DC converter 200 receives as an input the DC input voltage of the power converter 100, and provides as an output a regulated DC output voltage which is greater in magnitude than the DC input voltage. The inverter stage 400 is coupled to the DC output of the DC/DC converter 200. The inverter stage 400 receives as an input the regulated DC output voltage from the DC/DC converter 200, and provides as an output an AC output voltage signal having a piece-wise linear sinusoidal waveform. The bias power supply 300 receives as an input the DC input voltage of the power converter 100. The bias power supply 300 is coupled to the DC/DC converter 200 and the inverter stage 400, and provides bias voltages for the DC/DC converter 200 and the inverter stage 400.

DC/DC Converter 200

Figure 2:
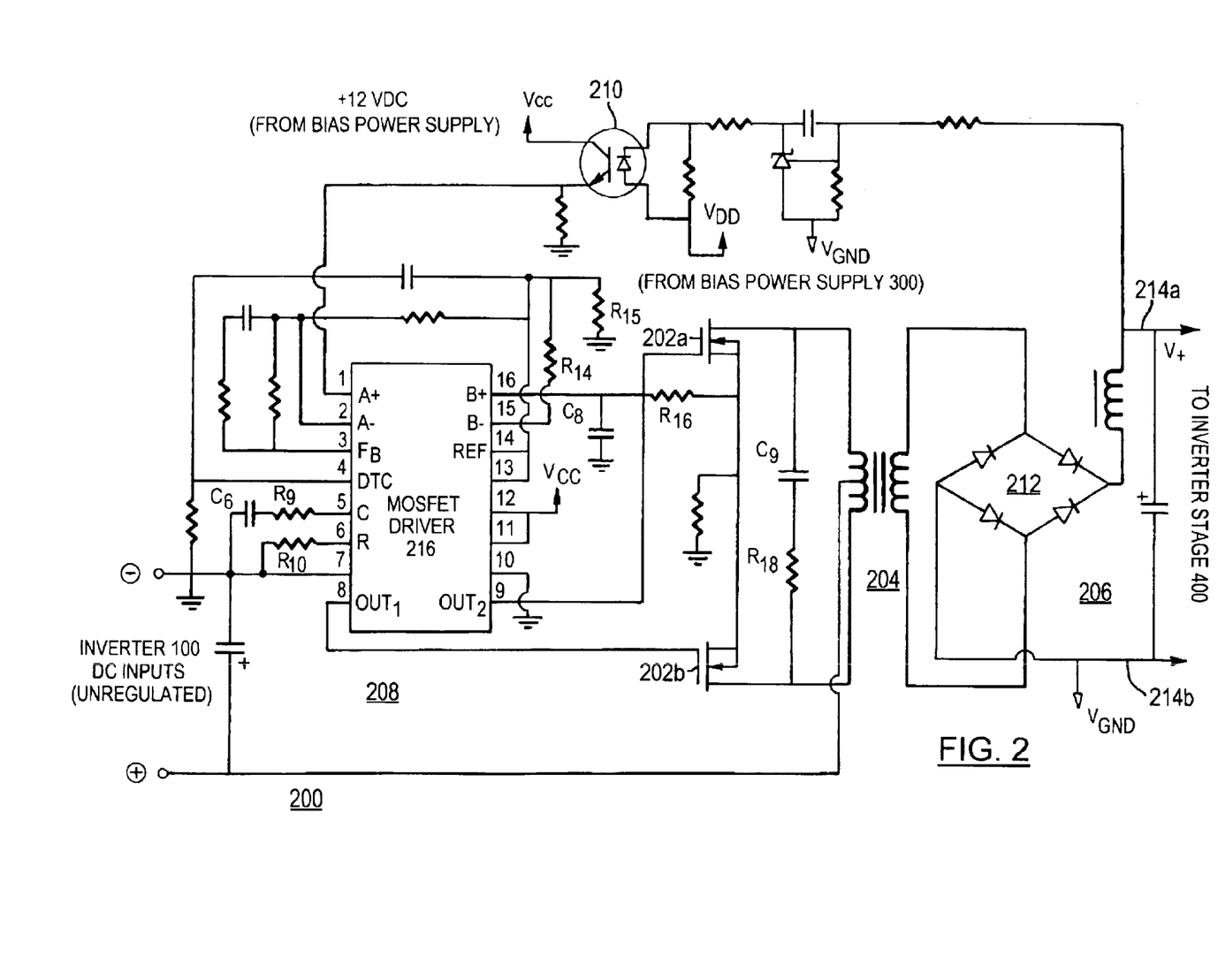
FIG. 2 is a schematic view of the DC/DC converter shown in FIG. 1.

The DC/DC converter 200 is shown in detail in FIG. 2. As shown, the DC/DC converter 200 includes a pair of MOSFET switches 202a, 202a, a high frequency step-up transformer 204 whose primary winding is driven by the MOSFETs 202, a low pass filter 206 connected to the secondary (output) winding of the transformer 204, a switch controller 208 connected to the MOSFET switches 202 for controlling their conduction intervals, and an opto-coupler 210 coupled between the switch controller 208 and the secondary (output) winding of the transformer 204.

The MOSFET switches 202 have their source terminals connected together, and their drain terminals connected to a respective end of the primary winding of the transformer 204. The centre-tap of the transformer 204 is connected to the positive DC input rail of the power inverter 100. As will be explained, the switch controller 208 applies complementary gating signals to the MOSFET switches 202, to thereby develop a square wave signal across the primary winding and a square wave output signal across the secondary winding. Snubber components C9 and R18 are connected across the primary winding to reduce voltage spikes when the MOSFETs are switched.

The secondary winding of the transformer 204 is connected to a full-wave diode rectifier 212, which converts the square wave output signal into a notched DC output signal. The low pass filter 206 comprises the series combination of an inductor and a capacitor. The low pass filter 206 filters the notched DC output signal of the transformer 204, to thereby output a constant DC voltage. The output voltage of the low pass filter 206 is fed to the inverter stage 400 via a pair of conductors 214a, 214b, which respectively act as the positive and negative power supply rails for the inverter stage 400. The transformer 204 and the optocoupler 210 together electrically isolate the converter DC input from the inverter stage 400.

The switch controller 208 comprises an integrated circuit PWM control circuit 216, frequency control components C6, R9 and R10; and over-current feedback components C8 and R16. Preferably, the PWM control circuit 216 is implemented using a Texas Instruments TL598, although other forms of control circuits may be used. The PWM control circuit 216 includes a pulse-width modulator (PWM) circuit, a push-pull output driver stage, an internal oscillator, a precision voltage reference, an error amplifier A having inputs A− and A+, and an error amplifier B having inputs B− and B+.

The output driver stage of the PWM control circuit 216 is connected at its input to the output of the PWM stage, and has a pair of complementary outputs OUT1, OUT2 each connected to a respective gate terminal of the MOSFET switches 202. The output driver stage generates complementary gating signals at its outputs, the pulse width of which are determined by the pulse width of the PWM stage. As a result, the output driver stage controls the conduction intervals of the MOSFET switches 202 in accordance with the pulse width set by the PWM stage.

The frequency control components set the frequency of the internal oscillator. The internal oscillator clocks the PWM stage, preferably to 50 kHz. The error amplifiers A, B control the pulse width output signal of the PWM stage. Specifically, the voltage at input A− is set by the precision voltage reference (REF); and the voltage at input A+ is set by the emitter output of the opto-coupler 210. As a result, the amplifier A acts as the primary control loop amplifier for the PWM stage, maintaining the DC output voltage of the DC/DC converter 200 substantially constant by adjusting the pulse width of the gating signals applied to the MOSFET switches 202 as the input voltage to the DC/DC converter 200 varies.

The voltage at input B− is set by the precision voltage reference output REF and the voltage divider comprising R14 and R15; and the voltage at input B+ is set by the voltage developed at the common source connection of the MOSFET switches 202 and resistor R30. As a result, the amplifier B limits the current through the MOSFET switches 202 in the event of an overload condition.

Bias Power Supply 300

Figure 3:
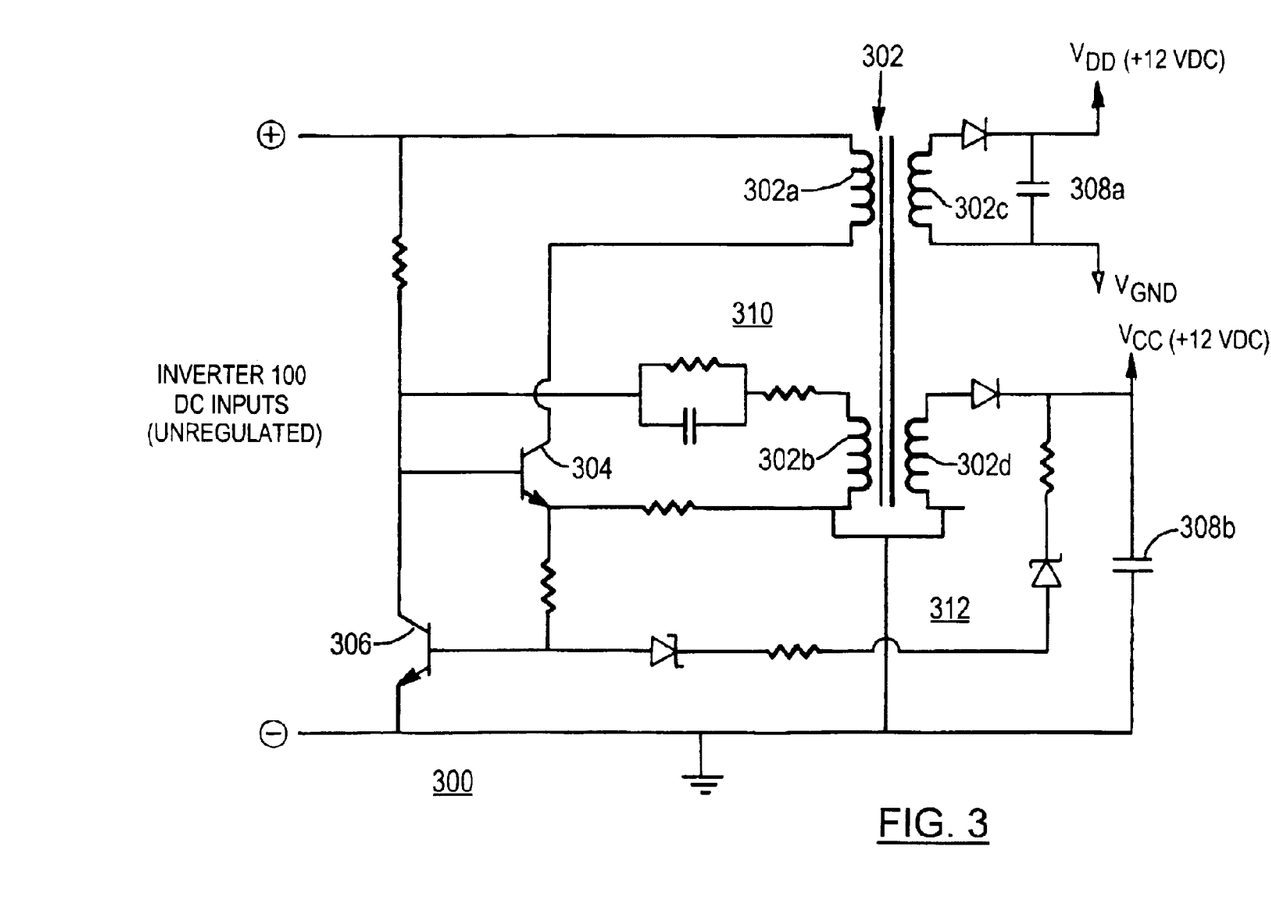
FIG. 3 is a schematic view of the bias power supply shown in FIG. 1.

The bias power supply 300 is shown in detail in FIG. 3. As shown, the power supply 300 includes a transformer 302, a primary transistor 304, a secondary transistor 306, first and second half-wave rectifiers 308a, 308b, a time delay circuit 310, and a voltage regulator 312. The transformer 302 has first and second primary windings 302a, 302a, and first and second secondary windings 302c, 302d wound on a common transformer core.

One end of the first primary winding 302a is connected to the positive rail of the power inverter 100, and the opposite end is connected to the collector terminal of the primary transistor 304. The emitter of the primary transistor 304 is coupled to the base terminal of the secondary transistor 306.

One end of the second primary winding 302a is connected to the negative rail of the power inverter 100, and the opposite end is connected to one end of the time delay circuit 310. The opposite end of the time delay circuit 310 is connected to the base terminal of the primary transistor 304 and the collector terminal of the secondary transistor 306, and is coupled to the positive rail of the power inverter 100. The time delay circuit 310 comprises a series combination of a resistor and capacitor.

In operation, initially the primary transistor 304 will be on, the secondary transistor 306 will be off, and current will flow through the first and second primary windings 302a, 302a. However, the emitter current from the primary transistor 304 will cause the base current of the secondary transistor 306 to increase. When the base current of the secondary transistor 306 reaches a threshold base current level, the secondary transistor 306 will turn on causing the primary transistor 304 to turn off. The voltage across the first and second primary windings 302a, 302a will reverse, initially maintaining current flow into the base terminal of the secondary transistor 306.

Current will continue to flow through the second primary winding 302a into the base terminal of the secondary transistor 306, for a period of time determined by the time delay circuit 310. Thereafter, the secondary transistor 306 will turn off, causing the primary transistor 304 to turn back on, and the voltage across the first and second primary windings 302a, 302a to reverse again. The primary and secondary transistors 304, 306 will continue to turn on and off in a complementary fashion, thereby producing a square-wave voltage signal at the transformer secondaries 302c, 302d.

The first rectifier 308a half-wave rectifies the output voltage from the first secondary 302c, and the second rectifier 308b half-wave rectifies the output voltage from the second secondary 302d. The rectified output voltage of the first rectifier 308a applies bias voltage to the PWM control circuit 216 and the opto-coupler 210 of the DC/DC converter 200. The rectified output voltage of the second rectifier 308a applies bias voltage to the inverter stage 400.

The voltage regulator 312 comprises a series combination of a zener diode and a resistor, coupled between the second rectifier 308b and the base terminal of the secondary transistor 306. The voltage regulator 312 applies additional base current to the base terminal of the secondary transistor 306, to thereby regulate the output voltage of the rectifiers 308. Preferably, the voltage regulator 312 maintains the output voltage of the rectifiers 308 at +12 volts DC.

Inverter Stage 400

Figure 4:
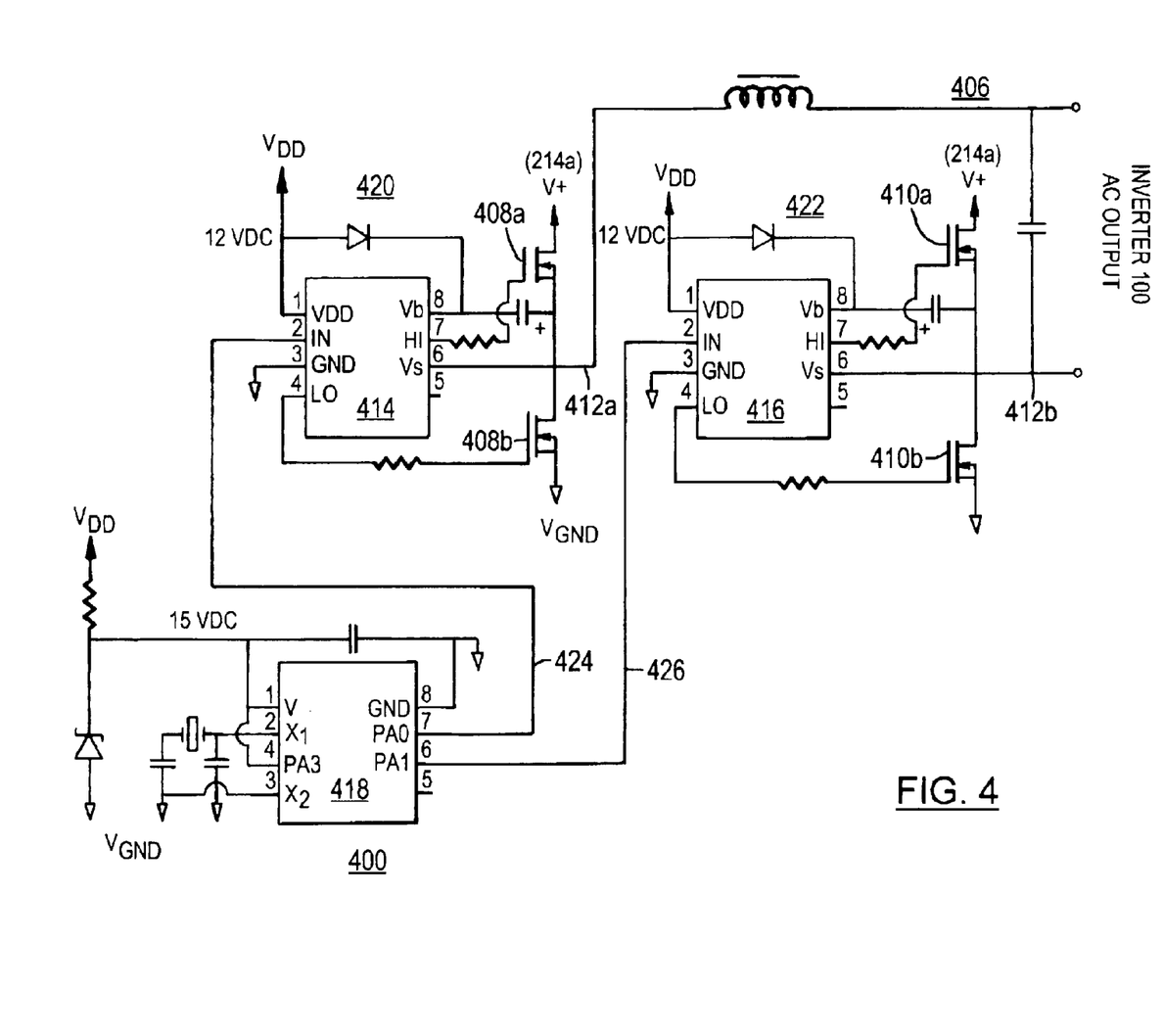
FIG. 4 is a schematic view depicting first and second electronic switches of the switch means of the inverter stage shown in FIG. 1.

The inverter stage 400 is shown in detail in FIG. 4. As shown, the inverter stage 400 includes a switch stage, a switch controller, and a low pass filter 406. The switch stage includes first and second electronic switches 408a, 408b, and third and fourth electronic switches 410a, 410b. Preferably, the electronic switches 408, 410 comprise MOSFETs, however other forms of electronic switches may be used.

The drain terminal of the first switch 408a is connected to the positive supply rail 214a from the DC/DC converter 200, and the source terminal of the second switch 408b is connected to the negative supply rail 214b. The source terminal of the first switch 408a is connected to the drain terminal of the second switch 408b, the interconnection comprising a first switch output 412a of the switch stage. The drain terminal of the third switch 410a is connected to the positive supply rail 214a, and the source terminal of the fourth switch 410b is connected to the negative supply rail 214b. The source terminal of the third switch 410a is connected to the drain terminal of the fourth switch 410b, the interconnection comprising a second switch output 412a of the switch stage.

Figure 5A:
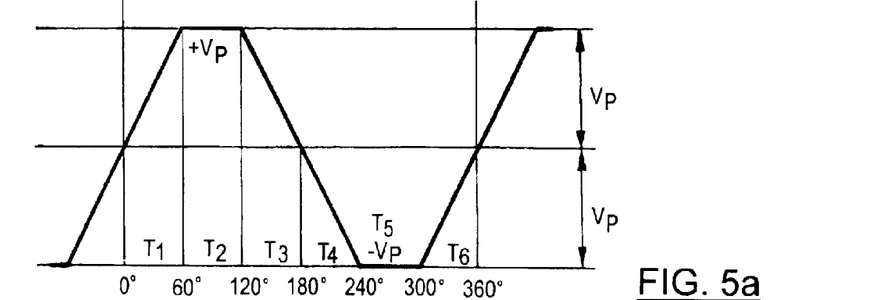
FIG. 5a is a timing diagram depicting the output voltage waveform of the inverter stage.
Figure 5B:
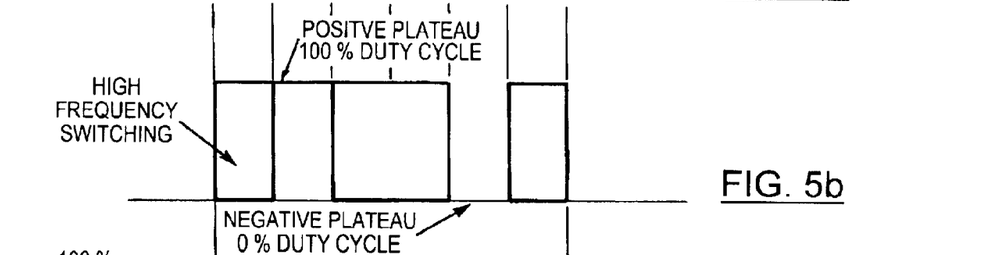
FIG. 5b is a timing diagram depicting the voltage waveform output by the first electronic switch of the inverter stage.

As will be explained, the switch controller applies gating signals to the first and second MOSFET switches 408, to thereby cyclically couple the first switch output 412a to the positive and negative supply rails 212. As shown in FIG. 5b, the gating signals applied to the MOSFET switches 408 also cause the first switch output 412a to output a constant amplitude signal, with a duty cycle which cyclically varies linearly between 0% and 100%. The switch controller also applies gating signals to the third and fourth MOSFET switches 410 which, as shown in FIG. 5d, cyclically couples the second switch output 412a to the positive and negative supply rails 212. In this manner, the switch controller cyclically inverts the phase of the constant amplitude signal at the switch output 412a between a positive polarity and a negative polarity. To effect this phase inversion, the duty cycle of the gating signals applied to the third and fourth MOSFET switches 410 has only two values, 0% and 100%, and varies between these two extremes twice per phase.

The switch controller includes a first MOSFET driver 414 coupled to the first and second MOSFET switches 408, a second MOSFET driver 416 coupled to the third and fourth MOSFET switches 410, and a microcontroller 418 connected to the first and second MOSFET drivers 414, 416. The microcontroller 418 applies clock signals to the first and second MOSFET drivers 414, 416, to thereby enable the MOSFET drivers 414, 416 to apply the gating signals to the MOSFET switches 408, 410.

The MOSFET drivers 414, 416 and the microcontroller 418 are powered by the +12 volt DC outputs of the bias power supply 300. Preferably, the MOSFET drivers 414, 416 are implemented using an International Rectifier Corp. IR21111, and the microcontroller 418 is implemented using a Microchip Corp. PIC16C672, although other integrated circuits may be used.

The first MOSFET driver 414 includes a high side driver output coupled to the gate terminal of the first MOSFET switch 408a, and a low side driver output coupled to the gate terminal of the second MOSFET switch 408b. The high side driver output makes use of a bootstrap circuit 420 comprising a diode and a capacitor for saturating the first MOSFET switch 408a when the first MOSFET driver 414 closes the first MOSFET switch 408a. Similarly, the second MOSFET driver 416 includes a high side driver output coupled to the gate terminal of the third MOSFET switch 410a, and a low side driver output coupled to the gate terminal of the fourth MOSFET switch 410b. The high side driver output of the second MOSFET driver 416 makes use of a bootstrap circuit 422 comprising a diode and a capacitor for saturating the third MOSFET switch 410a when the second MOSFET driver 416 closes the third MOSFET switch 410a.

The microcontroller 418 includes an internal oscillator, and first and second clock outputs 424, 426. To ensure greater accuracy of the oscillator, the microcontroller 418 is connected to an external 10 MHz XTAL (together with bypass capacitors). The first clock output 424 is connected to the clock input of the first MOSFET driver 414, and the second clock output 426 is connected to the clock input of the second MOSFET driver 416. Preferably, the first clock output 424 provides a pulse train of sufficiently high frequency that the low pass filter 406 outputs an AC output signal having an acceptable amount of harmonic distortion. Also, the second clock output 426 provides a square wave signal having a frequency equal to the desired frequency of the AC output signal. In one implementation, the first clock output 424 provides a 30 kHz pulse train, and the second clock output 426 provides a 60 Hz square wave.

Figure 5C:
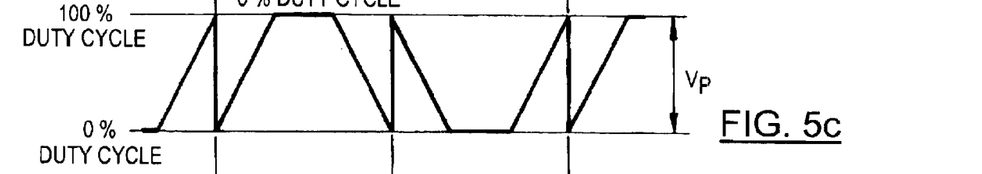
FIG. 5c is a timing diagram depicting the voltage waveform output by the first electronic switch of the inverter stage after filtering.
Figure 5D:
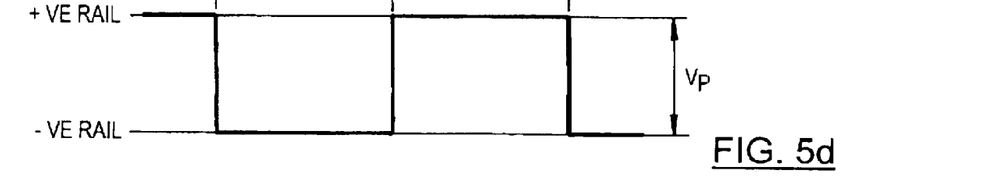
FIG. 5d is a timing diagram depicting the voltage waveform output by the second electronic switch of the inverter stage.

As shown in FIG. 5c, the pulse train of the first clock output 424 is pulse-width modulated, and is segmented into six distinct intervals. The microcontroller 418 is configured to set the duty cycle of the pulse train at 100% for one time interval (T2) of the pulse train, and to set the duty cycle of the pulse train at 0% for another time interval (T5) of the pulse train. During the interval T2, the first MOSFET switch 408a is fully on and the second -MOSFET switch 408b is fully off. Conversely, during the interval T5, the first MOSFET switch 408a is fully off and the second MOSFET switch 408b is fully on.

The microcontroller 418 is configured to linearly increase the duty cycle of the first clock output 424 from 0% to 100% for the interval (T1) immediately preceding the interval (T2) during which the duty cycle of the pulse train is 100%, and again for the interval (T6) immediately following the interval (T5) during which the duty cycle of the pulse train is 0%. Conversely, the microcontroller 418 is configured to linearly decrease the duty cycle of the first clock output 424 from 100% to 0% for the interval (T3) immediately following the interval (T2) during which the duty cycle of the pulse train is 100%, and again for the interval (T4) immediately preceding the interval (T5) during which the duty cycle of the pulse train is 0%.

The microcontroller 418 is also configured to maintain the second clock output 426 substantially at the negative supply rail 212a for the intervals T1, T2 and T3, and to maintain the second clock output 426 substantially at the positive supply rail 212a for the intervals T4, T5 and T6. As a result, the phase of the AC output signal varies cyclically between a positive polarity during which the third MOSFET switch 410a is kept off and the fourth MOSFET switch 410b is kept on (intervals T1, T2 and T3), and a negative polarity during which the third MOSFET switch 410a is kept on and the fourth MOSFET switch 410b is kept off (intervals T4, T5 and T6). The first and second clock outputs 424, 426 are synchronized such that the duty cycle of the first clock output 424 varies between 0% and 100% twice during the positive phase and twice during the negative phase.

The low pass filter 406 comprises the series combination of an inductor and a capacitor. The low pass filter 406 is connected to the switch output 412, and filters the constant amplitude signal of the switch stage to thereby produce an AC output signal. As shown in FIGS. 5a and 5c, during the interval T2, where the duty cycle of the first clock output 424 is 100%, the waveform of the AC output signal exhibits a first plateau having an amplitude corresponding to the positive power supply rail 214a. During the interval T5, where the duty cycle of the first clock output 424 is 0%, the waveform of the AC output signal exhibits a second plateau having an amplitude corresponding to the negative power supply rail 214b.

During the intermediate intervals T3 and T4, the waveform of the AC output signal exhibits a linearly decreasing portion extending between the first and second plateaus. During the intermediate intervals T1 and T6, the waveform of the AC output signal exhibits a linearly increasing portion extending between the second and first plateaus. Consequently, the AC output signal has a piece-wise linear approximated sinusoidal waveform. Alternately, the AC output signal may be described as having a trapezoidal or clipped triangular waveform.

Relation to Sinusoidal Waveform

The RMS value of the approximated sinusoid is Vrms= [a+0.577 (b-a)]Vpeak/b,
where:
  a is the duration of the plateau portion of the approximated sinusoid
  b is the duration of each half period of the approximated sinusoid Preferably, each interval T1, T2, T3, T4, T5, T6 corresponds to 60° of the period of the approximated sinusoid, so that b=3a.

Consequently, the RMS value of the approximated sinusoid is 0.718 Vpeak. As will be apparent, the RMS value of a pure sinusoid is 0.707 Vpeak. Consequently, the RMS value of the approximated sinusoid is substantially the same as the RMS value of a pure sinusoid. Further, experimental results with the inverter stage 400 have revealed that the inverter stage 400 suppresses both even and odd harmonics, such that the approximated sinusoid exhibits less than 4% total harmonic distortion. This value of harmonic distortion is consistent or less than that obtained with prior art waveform synthesizers. However, in contrast to prior art waveform synthesizers, the number of switch stages (and therefore the cost) required to produce the AC output signal is substantially reduced.

The present invention is defined by the claims appended hereto, with the foregoing description being illustrative of a preferred embodiment of the invention. Those of ordinary skill may envisage certain modifications to the described embodiment, which although not suggested herein, do not depart from the scope of the present invention, as defined by the appended claims.

We claim:

1. A DC-to-AC inverter comprising:
    a switch stage including a switch output and switch means coupled to the switch output for switching the switch output between a pair of power supply rails;
    a switch controller coupled to the switch stage and being configured to cyclically linearly vary a duty cycle of an output signal at the switch output; and
    a filter coupled to the switch output for producing a piece-wise linear approximated sinusoidal output waveform from the output signal.

2. The inverter according to claim 1, wherein the switch controller is configured to vary the duty cycle in a manner such that the output waveform has a first plateau corresponding to a signal level of one of the power supply rails, a second plateau corresponding to a signal level of the other of the power supply rails, and an intermediate portion varying linearly between the first plateau and the second plateau.

3. The inverter according to claim 2, wherein the duty cycle is 0% during the first plateau, and is 100% during the second plateau.

4. The inverter according to claim 3, wherein the switch controller is configured to cyclically vary a phase of the output signal between a first polarity and a second polarity, with the intermediate portions occurring twice per phase.

5. The inverter according to claim 1, wherein the switch controller is configured to vary the duty cycle in a manner such that the output signal has a first interval during which the duty cycle is 0%, a second interval during which the duty cycle is 100%, and an intermediate interval intermediate the first and second intervals during which the duty cycle varies linearly therebetween.

6. The inverter according to claim 5, wherein the switch controller is configured to cyclically vary a phase of the output signal between a first polarity and a second polarity, with the intermediate intervals occurring twice per phase.

7. The inverter according to claim 1, wherein the switch controller is configured to vary the duty cycle between a first rate during which the output waveform has a first plateau corresponding to a signal level of one of the power supply rails, and a second rate during which the output waveform has a second plateau corresponding to a signal level of the other of the power supply rails.

8. The inverter according to claim 1, wherein the switch means includes a first electronic switch having an input coupled to one of the power supply rails, and a second electronic switch having an input coupled to the other of the power supply rails, the switch output comprising an interconnection of the outputs of the first and second electronic switches, and the switch controller is configured to vary the duty cycle between a first rate at which the first electronic switch is fully on and the second electronic switch is fully off, and a second rate at which the first electronic switch is fully off and the second electronic switch is fully on.

9. The inverter according to claim 8, wherein the switch means includes a third electronic switch having an input coupled the one power supply rail, and a fourth electronic switch having an input coupled to the other power supply rail, the switch output comprising the interconnection of the outputs of the first and second electronic switches and an interconnection of the outputs of the third and fourth electronic switches, and the switch controller is configured to cyclically vary the phase of the output signal between a first polarity during which the third switch is on and the fourth switch is off, and a second polarity during which the third switch is off and the fourth switch is on.

10. The inverter according to claim 1, wherein the output waveform has a first plateau corresponding to a signal level of one of the power supply rails, a second plateau corresponding to a signal level of the other of the power supply rails, and an intermediate portion varying linearly between the first plateau and the second plateau.

11. A DC-to-AC inverter comprising:
   a switch stage including a switch output and switch means coupled to the switch output, the switch means being configured to provide a switched constant-peak-amplitude output signal at the switch output;
   a switch controller coupled to the switch stage and being configured to cyclically linearly vary a duty cycle of the output signal; and
   a filter coupled to the switch output and configured to produce a piece-wise linear approximated sinusoidal output waveform from the output signal.

12. The inverter according to claim 11, wherein the switch controller is configured to vary the duty cycle in a manner such that the output waveform has a first plateau corresponding to a first power supply signal level, a second plateau corresponding to a second power supply signal level, and an intermediate portion varying linearly between the first plateau and the second plateau.

13. The inverter according to claim 12, wherein the duty cycle is 0% during the first plateau, and is 100% during the second plateau.

14. The inverter according to claim 11, wherein the switch controller is configured to vary the duty cycle in a manner such that the output signal has a first interval during which the duty cycle is 0%, a second interval during which the duty cycle is 100%, and an intermediate interval intermediate the first and second intervals during which the duty cycle varies linearly therebetween.

15. The inverter according to claim 11, wherein the switch controller is configured to vary the duty cycle between a first rate during which the output waveform has a first plateau corresponding to a first power supply signal level, and a second rate during which the output waveform has a second plateau corresponding to a second power supply signal level.

16. The inverter according to claim 11, wherein the switch means includes a first electronic switch coupled to a first power supply rail, and a second electronic switch coupled to another power supply rail, the switch output being coupled to an interconnection of the electronic switches, and the switch controller is configured to vary the duty cycle between a first rate at which the first electronic switch is fully on and the second electronic switch is fully off, and a second rate at which the first electronic switch is fully off and the second electronic switch is fully on.

17. The inverter according to claim 11, wherein the output waveform has a first plateau corresponding to a first power supply signal level, a second plateau corresponding to a second power supply signal level, and an intermediate portion varying linearly between the first plateau and the second plateau.

18. A method for converting DC power into AC power, comprising the steps of:
   with switch means generating with a pulse-width modulated output signal, the output signal having a cyclically linearly varying duty cycle and an amplitude varying between a pair of signal levels; and
   filtering the output signal in a manner to produce a piece-wise linear approximated sinusoidal output waveform.

19. The method according to claim 18, wherein the generating step comprises varying the duty cycle in a manner such that the output waveform has a first plateau corresponding to a first power supply signal level, a second plateau corresponding to a second power supply signal level, and an intermediate portion varying linearly between the first plateau and the second plateau.

20. The method according to claim 19, wherein the duty cycle is 0% during the first plateau, and is 100% during the second plateau.

21. The method according to claim 18, wherein the generating step comprises varying the duty cycle in a manner such that the output signal has a first interval during which the duty cycle is 0%, a second interval during which the duty cycle is 100%, and an intermediate interval intermediate the first and second intervals during which the duty cycle varies linearly therebetween.

22. The method according to claim 18, wherein the generating step comprises varying the duty cycle between a first rate during which the output waveform has a first plateau corresponding to a first power supply signal level, and a second rate during which the output waveform has a second plateau corresponding to a second power supply signal level.

23. The method according to claim 18, wherein the switch means includes a first electronic switch coupled to a first power supply rail, and a second electronic switch coupled to another power supply rail, the switch output being coupled to an interconnection of the electronic switches, and the generating step comprises varying the duty cycle between a first rate at which the first electronic switch is fully on and the second electronic switch is fully off, and a second rate at which the first electronic switch is fully off and the second electronic switch is fully on.

24. The method according to claim 18, wherein the output waveform has a first plateau corresponding to a first power supply signal level, a second plateau corresponding to a second power supply signal level, and an intermediate portion varying linearly between the first plateau and the second plateau.

* * * * *